Nov. 30, 1954   N. C. EPPS   2,695,718
AIRCRAFT TOWING DEVICE
Filed Oct. 4, 1950   2 Sheets-Sheet 2
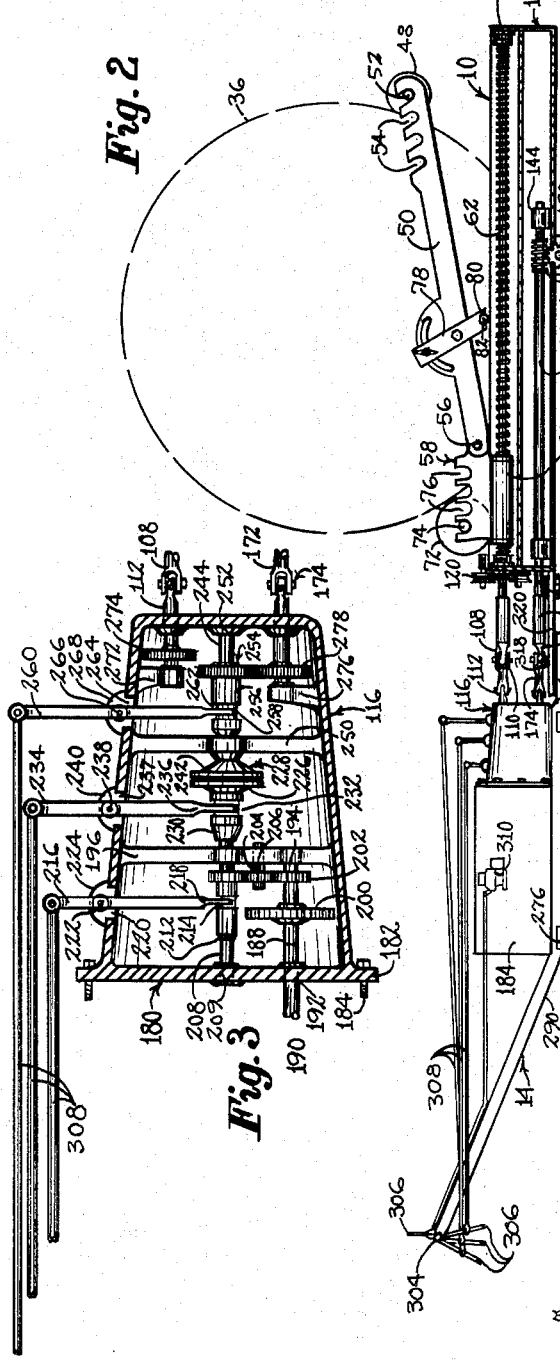
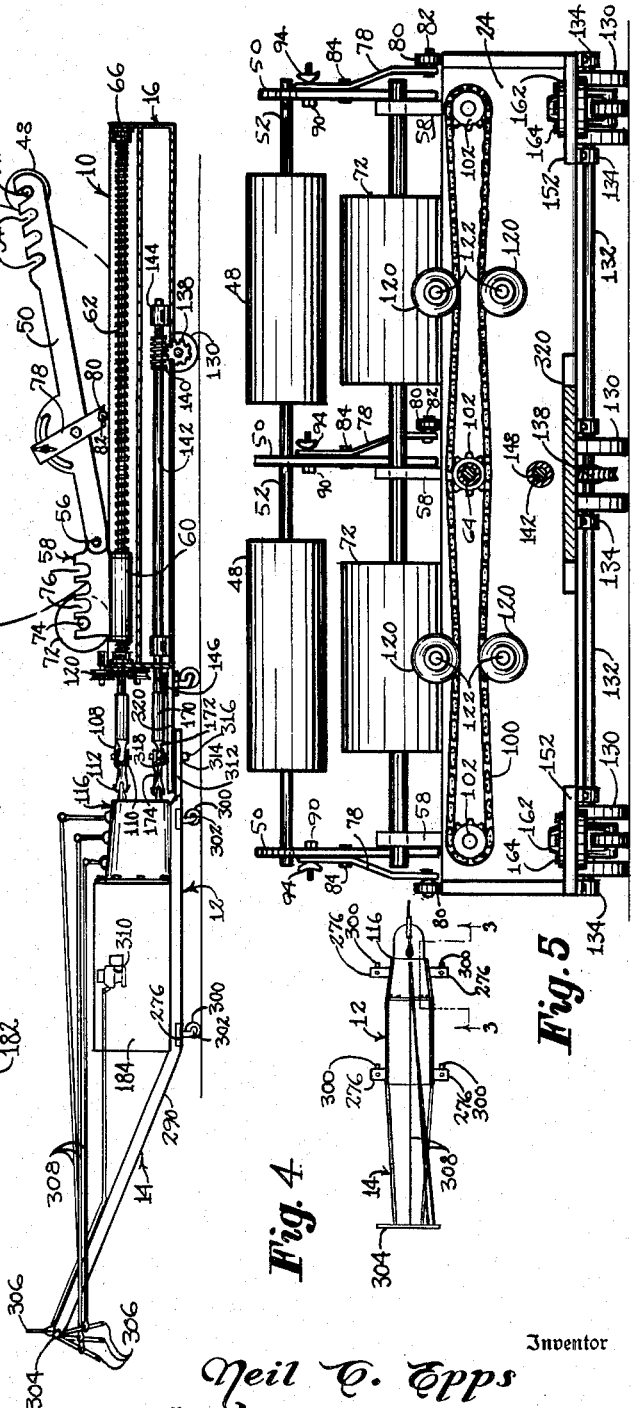
Inventor
Neil C. Epps
By A. Hiram Sturges
Attorney 
United States Patent Office 2,695,718
Patented Nov. 30, 1954

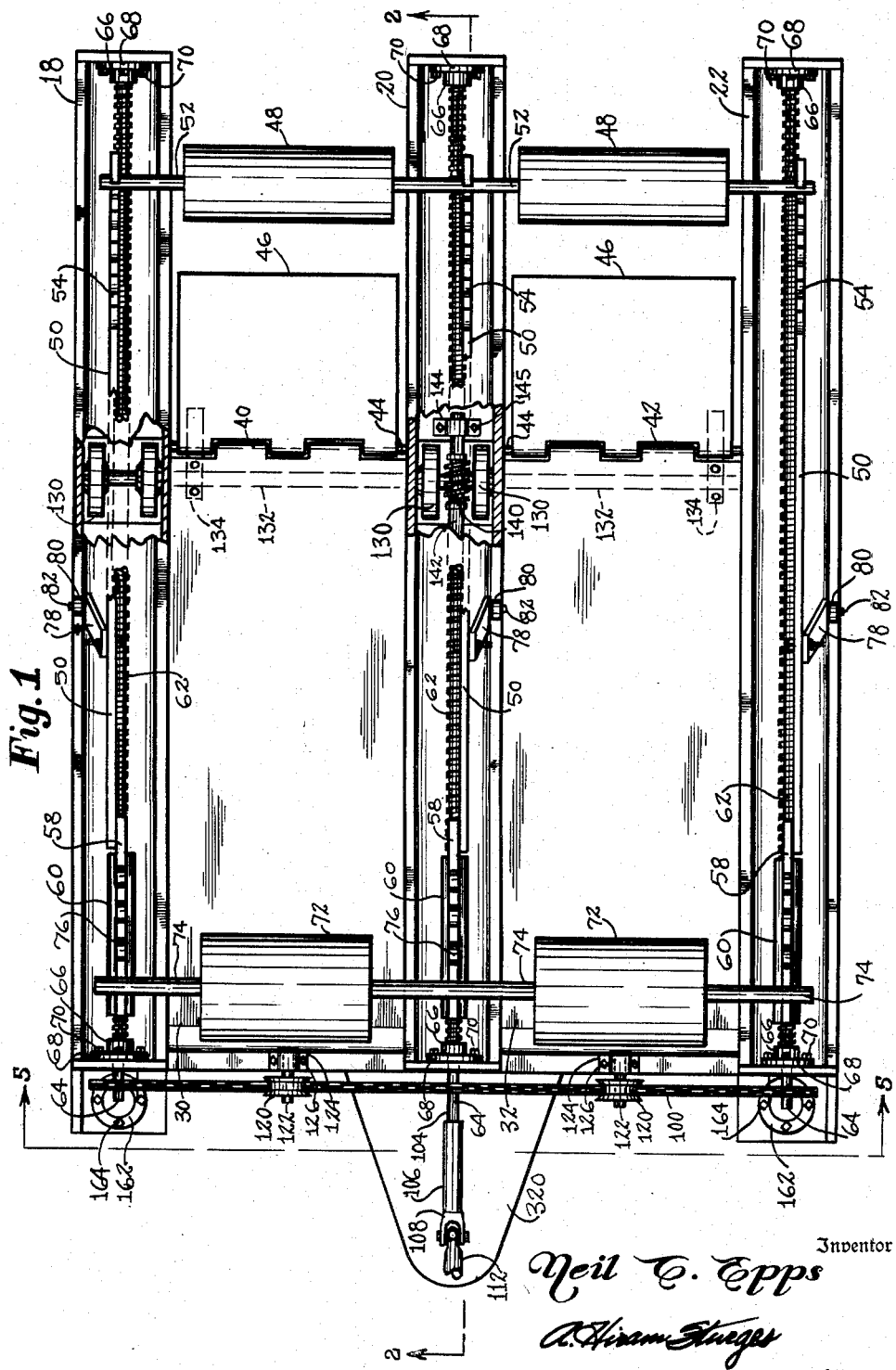

2,695,718

AIRCRAFT TOWING DEVICE

Neil C. Epps, Omaha, Nebr.

Application October 4, 1950, Serial No. 188,320

3 Claims. (Cl. 214—333)

This invention relates to aircraft and more particularly it is an object of this invention to provide a device for towing heavy aircraft of the heavier-than-air type.

In storing and maintaining large aircraft it becomes necessary to move the aircraft about the field and in and out of hangars by some outside source of power other than the power used for propelling the aircraft in the air.

In the past, towing devices have been extremely large so that they would have sufficient weight to provide traction for towing aircraft weighing many tons. Due to this weight requirement the size of these towing devices has been such that their dimensions do not permit clearance under the fuselage of the aircraft. The size and weight of these towing devices also subtracts from the efficiency and maneuverability in moving or towing aircraft.

Therefore, it is an object of this invention to provide an aircraft towing device which is of a limited height so that it will easily pass under the fuselage and the propellers of the aircraft.

Another object of this invention is to provide an aircraft towing device whereby the wheels of the aircraft are moved up an inclined plane and are supported on a platform thereby utilizing the weight of the aircraft to provide the weight necessary for traction.

Yet another object of this invention is to provide an aircraft towing device having an aircraft wheel supporting platform and carrier and an engine or motor carrying vehicle removably and pivotally connected thereto. The engine or motor carrying vehicle may be used with any of a number of aircraft wheel supporting platforms and carriers of like design and size or of other designs and sizes.

Still another object of this invention is to provide a means for moving the wheels of an airplane up an inclined plane and onto the said platform, this means being adjustable to more than one size of aircraft.

A further object of this invention is to provide an aircraft towing device having a means for removing the wheel of the aircraft from a platform.

Yet a further object of this invention is to provide an aircraft towing device having a platform, upon which the wheel of the aircraft rests, that has driving wheels which latter receive their power from an engine carrying vehicle, the latter having a handle for steering, levers for control, and a transmission for engaging or reversing the rotation of the power.

Yet another object of the invention is to provide a device for the purpose described which is sturdy and durable in construction, reliable and efficient in operation, and relatively simple and inexpensive to manufacture, assemble and utilize.

In the drawings:

Figure 1 is a top plan view of the aircraft wheel supporting platform showing portions broken away for the sake of clarity.

Figure 2 is a longitudinal section of the aircraft wheel supporting platform taken along the line 2—2 of Figure 1 and shown connected to the engine supporting vehicle, which latter is shown in the side elevation view. The outline of the aircraft wheel is shown in dotted lines.

Figure 3 is a longitudinal section showing the detail of the transmission taken along the line 3—3 of Figure 4.

Figure 4 is a top plan view of the engine and the engine-supporting vehicle.

Figure 5 is a vertical section taken along the line 5—5 of Figure 1.

Referring to the drawings in detail, a preferred embodiment of this invention is shown in which an aircraft towing device comprises an aircraft wheel supporting platform and carrier generally designated at 10, an engine-carrying vehicle generally indicated at 12, and a handle or control portion generally indicated at 14.

The largest of the heavier-than-air craft are commonly supported by two landing gears protruding downwardly from the wings or fuselage, each landing gear having two wheels side-by-side.

The aircraft wheel supporting platform and carrier of the aircraft towing device has a frame 16 which comprises three elongated longitudinally disposed rectangular enclosures 18, 20, and 22. The two enclosures 18 and 22 form the side members of the frame and the enclosure 20 forms the center member.

The three enclosures 18, 20, and 22 are connected at the front by a transversely disposed rectangular end plate 24. On both sides of the center enclosure 20 and between the center enclosure 20 and each of the sides member 18 and 22 are flat rectangular platform floors 30 and 32. The floors 30 and 32 extend rearwardly from the front plate 24 a distance greater than half the diameter of the largest aircraft wheel for which the aircraft towing device is to be used, but not the entire length of the enclosures 18, 20, and 22.

The rear end of the floors 30 and 32 are provided with integrally formed hinges 40 and 42. A hinge pin 44 is rotatably disposed within each of the hinges 40 and 42. Pivotally disposed about the hinge pins 44 are two rectangular flat inclinedly disposed members 46 which serve as inclines for which the aircraft wheels 36, shown in dotted lines in Figure 2, may roll upon and be brought up to the level of the floors 30 and 32.

The aircraft landing wheels 36 are moved up the inclined planes and onto the platform floors 30 and 32 by means of two elongated cylindrical rollers 48 which latter are transversely and rotatably disposed behind the aircraft landing wheels 36 on a plurality of rearwardly extending arms 50. The rollers 48 are journaled about an elongated shaft 52 which latter may be inserted in any of a plurality of upwardly opening U-shaped slots 54 in the top of the arms 50.

The arms 50 are pivotally disposed at the forward end about pins 56 which latter are transversely disposed through brackets 58.

The brackets 58 are integrally formed with elongated internally-threaded cylindrical sleeves 60, which latter are threadedly disposed about elongated worm screws 62. The screws 62 are rotatably and longitudinally disposed within the enclosures 18, 20, and 22, and are provided with integrally formed shafts 64 which latter are disposed through, and protrude outwardly from, apertures through the forward ends of the enclosures 18, 20, and 22.

On the inner walls of both ends of each of the enclosures 18, 20, and 22 are bearings 66 which latter are provided with annular flanges 68, and are attached to the inner walls in the ends of the enclosures 18, 20, and 22 by a plurality of cap screws 70, which latter are threadably disposed in the ends of the enclosures 18, 20, and 22.

The aircraft wheels 36 are moved off the platform floors 30 and 32 by a second set of two elongated cylindrical rollers 72, which latter are transversely and rotatably disposed in front of the aircraft landing wheels 36. The rollers 72 are journaled about a shaft 74 which latter is transversely disposed and may be inserted in any of a plurality of upwardly opening slots 76 in the brackets 58.

On each of the arms 50, adjacent the forward end, is a pivotally disposed height adjusting lever 78. Each of the levers 78 are provided at the lower end with a roller 80, which latter is rotatably disposed about a transversely disposed pin 82, which latter is integrally formed with the levers 78. The rollers 80 roll along the upper surfaces of the enclosures 18, 20, and 22.

The levers 78 are pivoted about a pin 84 which latter is integrally formed with and transversely disposed adjacent the lower side of the arms 50.

Each of the arms 50 has a convex semi-circular ear 86 which latter protrudes upwardly from the upper side of the arms 50. The arc forming the outline of the ear 86 has as its center the axis of the pin 84.

The ear 86 is provided with a semi-circular slot 88, the curved outline of which latter is in parallelism with the upper outline of the ear 86.

A bolt 90 is transversely disposed through the slot 88 and through an aperture 92 adjacent the upper end of the lever 78. The bolt 90 has a nut 94 threadedly disposed thereon for holding the lever in place after the arms 50 have been adjusted to the desired height.

The worm screws 62 receive their rotary motion from a continuous roller chain 100 which latter is trained about sprockets 102. The sprockets 102 are rotatably disposed on the forward ends of the shafts 64. The sprockets 102 receive their rotary motion from a drive shaft 104 which latter is rotatably attached to the forward end of preferably the center sprocket 102. The drive shaft 104 is telescopically disposed within an elongated tubular hub 106 which latter is integrally formed with the rear half 108 of a universal joint 110.

The forward half 112 of the universal joint 110 receives rotary motion from a power output shaft 114, the rear end of which latter is rotatably and removably attached to the forward universal joint half 112. The forward end of the shaft is rotatably disposed in the rear end of a power transmission generally indicated at 116.

Four chain tightening rollers 120 are rotatably disposed on shafts 122, which latter are attached to and extend forwardly from the front end member 24. The shafts 122 are held fast to the front end member 24 by means of clamps 124 which latter are held by screws 126. The screws 126 are threadedly disposed in the front end member 24.

The aircraft wheel supporting platform and carrier 10 is provided with a plurality of traction or driving wheels 130 rotatably mounted on a transversely disposed elongated shaft 132. The shaft 132 is rotatably disposed and journaled by inverted pillow block bearings 134, which latter are held fast to the underside of the frame 16 by cap screws 136 at a point adjacent to and beneath the rear ends of the platform floors 30 and 32.

At the center of the shaft 132 a worm wheel 138 is rotatably disposed and integrally formed thereto. The worm wheel 138 receives rotary motion from a longitudinally mounted worm screw 140 which latter is provided at both ends with an elongated integrally formed shaft 142.

The shaft 142 is rotatably disposed in the center enclosure 20 beneath the worm screw 62, and the rear end of the shaft 142 is journaled within a pillow block bearing 144, which latter is attached to the upper face of the bottom of the enclosure 20 by cap screws 145.

The forward end of the shaft 142 is rotatably disposed through, and has a portion 146 thereof which latter protrudes outwardly from, an aperture 148 in the front end of plate 24.

The enclosures 18 and 22 are provided with flat brackets 152, which latter protrude outwardly from the forward ends thereof. Protruding downwardly from the bottom of each of the brackets 152 a castor or trailing wheel 154 is mounted. The castor 152 comprises a wheel 156 rotatably mounted on a shaft 158 which latter is transversely disposed in the lower end of the legs or yoke 160 of the castor 152.

The yoke 160 is rotatably disposed about a vertical axis and is journaled within a thrust bearing 162, which latter is attached to the upper side of the brackets 152 by cap screws 164.

The forward end 146 of the drive shaft 142 is telescopically disposed within an elongated tubular hub 170 which latter is integrally formed with the rear half 172 of a universal joint 174.

The forward half 176 of the universal joint 174 receives rotary motion from a power output shaft 178, the rear end of which latter is rotatably and removably attached to the forward half of the universal joint 174. The forward end of the shaft 178 is rotatably disposed in the rear end of the power transmission 116.

The power transmission 116 comprises a totally enclosed case 180, which latter is provided with an annular flange 182 on the forward end thereof. The flange 182 is attached to the rear end of an engine or motor 184 by a plurality of cap screws 186 which latter are disposed through the annular flange 182 and are threadedly disposed in the rear end of the engine 184.

The power transmission 116 receives rotary motion from the engine 184 through an input shaft 186 which latter is longitudinally disposed and enters the case 180 at the lower forward end thereof. The forward end of the shaft is integrally formed with the drive shaft 190 of the engine 184 and is journaled in an aperture 192 in the lower forward end of the case 180. The rear end of the shaft 188 is provided in an aperture 194 in a vertically disposed bearing supporting brace 196, the ends of which latter are integrally formed with the walls of the case 180.

A first or forward rotation gear 200 is rotatably mounted on the shaft 188 approximately halfway between the forward end of the case 130 and bearing supporting brace 196. A second or reverse rotation gear 202 is rotatably mounted on the shaft 188 between the forward gear 200 and the bearing supporting brace 196.

An idler gear 204 is rotatably mounted on a stub shaft 206 which latter projects forwardly from, and is integrally formed with the bearing brace 196. The gear 204 receives rotary motion and is permanently engaged with the reverse rotation gear 202.

A secondary or forward control shaft 208 is rotatably and longitudinally disposed in the center of the transmission case 180. The forward end of the shaft 208 is journaled within an aperture 209 in the forward end of the transmission case 180, and the rear end is journaled within and protrudes rearwardly from the bearing supporting brace 196.

An engaging gear 210, having an elongated forward hub 212, which latter is provided with an annular groove 214, is rotatably and slidably mounted on the control shaft 208.

The sum of the pitch diameter of the idler gear 206 and half the pitch diameter of the reverse gear 202 is equivalent to half the pitch diameter of the forward gear 200, thus making it possible for the engaging gear 210 to slide into or out of engagement, and receive rotary motion from either the idler gear 206 or the forward gear 200.

A control lever 216 is provided with a yoke 218 at its lower end, the bifurcated ends of which latter are disposed in the annular groove 214 of the gear 210. The control lever 216 is pivotally disposed through a slot 220 in the top and outer periphery of the case 180 about a pin 222, which latter is transversely disposed in an upwardly projecting ear 224 on the top of the case 180.

A forward plate 226, of a friction clutch 228, is provided with an elongated forward hub 230, which latter is provided with an annular groove 232. The forward clutch plate is rotatably and slidably mounted on the rearward end of the control shaft 208.

A clutch control lever 234 is provided with a yoke 236 at its lower end, the bifurcated ends of which latter are disposed in the annular groove 232 of the forward clutch plate 226.

The control lever 234 is pivotally disposed through a longitudinal slot 237 in the top and outer periphery of the case 130 and about a pin 238, which latter is disposed in an upwardly projecting ear 240 integrally formed with the top of the case 180.

A rear clutch plate 242 of the clutch 238 is rotatably mounted on the forward end of a rear control shaft 244, which latter is axially aligned with the forward control shaft 208. The shaft 244 is journaled at the forward end by a vertically disposed bearing support brace 250, the ends of which latter are integrally formed with the case 180. The shaft 244 is journaled at its rear end in an aperture 252 which latter is disposed in the rear end of the case.

A transfer gear 254, having an elongated forward hub 256, which latter is provided with an annular groove 258, is rotatably and slidably disposed on the shaft 244 between the bearing brace 250 and the rear end of the case 180.

A control lever 260 is provided with a yoke 262 at its lower end, the bifurcated ends of which latter are disposed in the annular groove 258 of the transfer gear 254. The control lever 260 is pivotally disposed through a slot 264 through the top and outer periphery of the case 180 and about a pin 266 which latter is disposed in an upwardly projecting ear 268 on the top of the case 180.

A bearing supporting bracket 272 is vertically disposed in the top of the case 180 adjacent the rear end. The upper end of the bracket 172 is integrally formed with the case 180. The forward end of the shaft 114 is journaled within the bearing bracket 172.

A gear 274 is rotatably disposed on the shaft 114 between the bracket 272 and the rear end of the case 180.

The forward end of the drive shaft 78 is journaled within a bearing supporting bracket 276 which latter is vertically disposed in the bottom of the case 180 between the bearing bracket 272 and the rear end of the case 180. The lower end of the bracket 276 is integrally formed with the case 180. A gear 278 is rotatably disposed on the shaft 178 between the bracket 276 and the rear end of the case 180 and at a distance of approximately twice its width forward of the gear 274.

As the transfer gear 254 slides forwardly it engages with the gear 276 and provides rotary motion for the aircraft towing vehicle drive shaft 142. As the transfer gear 254 slides rearwardly it engages with the gear 274 and thus provides rotary motion for the loading mechanism screw 62.

The engine 184 and the power transmission 116 are mounted on the engine carrying vehicle 12 which latter includes a frame 290. The frame 290, as best seen in Figures 2 and 4, comprises two longitudinally disposed side members 292 and 294, which latter are integrally formed with and become part of the handle or control portion 14. The forward part of the side members 292 and 294 is inclinedly disposed with relation to the rearward part of the frame side members 292 and 294. Projecting outwardly from the side members 292 and 294 at both the forward and the rearward end of the motor are four transversely disposed brackets 276.

Casters 298, having wheels 300 rotatably mounted thereon, have their yokes 302 journaled within the brackets 296. A handle 304 is transversely disposed on the upper and forward end of the two side members 292 and 294 and projects outwardly from both sides of the side members 292 and 294.

A plurality of levers 306 are pivotally disposed about the handle 304. A plurality of linkrods 308 have their forward ends pivotally attached to the levers 306 and their rearward ends pivotally attached to the carburetor 310 on the engine 184 and the control levers 216, 234, and 260.

A transversely disposed flat pivot plate 312 is attached to the rear end of the side members 292 and 294 and is provided with an aperture 314. The aperture 314 receives a pivot pin 316 which latter is removably disposed in an aperture 318 through a second flat pivot plate 320 which latter is attached to the center of the forward end plate 24 of the aircraft vehicle supporting platform portion 10.

In describing the operation of the aircraft towing vehicle, the engine supporting vehicle and carrier 12 and the handle or control portion 14 will be hereinafter referred to as the power unit. The aircraft vehicle wheel supporting platform and carrier will be hereinafter referred to as the dolly.

The operator controls the forward and rearward motion of the dolly by manipulating the control unit and thus maneuvering the dolly into such a position so that the inclined surfaces 46 are immediately in front of the aircraft wheels 36.

He then inserts the rollers 48 in the slots 54 behind the aircraft wheels 36. By manipulating the handle and transferring the power to the leading mechanism the arm 50 moves the aircraft wheels 36 up onto the platform floors 30 and 32.

Efficiency in maneuvering the aircraft about the field and the hangar may be easily accomplished, depending on the skill of the operator in manipulating the control levers 306 and the handle 304. By reversing the rotation of the screw 62 the rollers 72 urge the aircraft wheels 36 off the platform floors 30 and 32 and onto the ground at which time the rear rollers 48 can be removed and the aircraft towing vehicle can be used for towing another aircraft. If the operator so desires he may leave the aircraft wheels supported by the dolly and use the power unit with other dollies. He may do this by removing the pin 316 through the pivot plates 312 and 320. The tubular hubs 106 and 170 will then slide off the drive shafts 104 and 142. The power unit may then be pulled manually and connected to other dollies.

I claim:

1. A device for the purpose described comprising: a frame; means on said frame for supporting a front wheel of an airplane; a ramp member having an inclined surface leading to said wheel supporting means at its upper end, the other end of said ramp member being adjacent the ground; means for causing said wheel to roll up said inclined plane onto said supporting means and said supporting means to move under said wheel; means for causing said supporting means and ramp member to move out from under said wheel; wheels for supporting said frame; a motor disposed forwardly of said frame; a mounting for supporting said motor; means drivably connecting said motor to at least one of said frame wheels, said connecting means including a universal joint; means pivotally attaching said mounting to said frame in a position complemental to said joint for horizontal pivoting of said mounting; turnably mounted wheels supporting said mounting; and means for steering said mounting.

2. A device for the purpose described comprising: a frame; means on said frame for supporting a front wheel of an airplane; a ramp member having an inclined surface leading to said wheel supporting means at its upper end, the other end of said ramp member being adjacent the ground; means for causing said wheel to roll up said inclined plane onto said supporting means and said supporting means to move under said wheel; means for causing said supporting means and ramp member to move out from under said wheel; wheels for supporting said frame; a motor disposed forwardly of said frame; a mounting for supporting said motor; means drivably connecting said motor to at least one of said frame wheels, said connecting means including a universal joint; means pivotally attaching said mounting to said frame in a position complemental to said joint for horizontal pivoting of said mounting; and turnably mounted wheels supporting said mounting.

3. A device for the purpose described comprising: a frame; means on said frame for supporting a front wheel of an airplane; a ramp member having an inclined surface leading to said wheel supporting means at its upper end, the other end of said ramp member being adjacent the ground; a mechanism for engaging the other side of said wheel from said device during placing of said device under said wheel, said mechanism including at least two rollers having horizontal axles, said rollers being vertically spaced apart for the purpose of engaging said wheel; means for causing said engaging mechanism to move with respect to said device in a direction generally toward said wheel supporting means for pulling said device under said wheel; a second engaging mechanism for engaging that side of said wheel which is disposed generally opposite said inclined surface, said second engaging mechanism including two rollers having axles horizontally disposed and vertically spaced apart, said rollers being for engaging the opposite side of said wheel from said first pair of rollers; means for causing said second engaging mechanism to move with respect to said frame in a direction generally toward said inclined surface for pushing said wheel off of said device; wheels for turnably supporting said frame; and driving means for said device.

References Cited in the file of this patent

UNITED STATES PATENTS

| Number | Name | Date |
| --- | --- | --- |
| 1,584,517 | Dinkelberg | May 11, 1926 |
| 1,856,787 | Schellentrager et al. | May 3, 1932 |
| 1,883,156 | Weaver et al. | Oct. 18, 1932 |
| 1,914,098 | Bean | June 13, 1933 |
| 2,240,723 | Stoehr | May 6, 1941 |
| 2,411,061 | Saxon | Nov. 12, 1946 |
| 2,452,481 | Morehead et al. | Oct. 26, 1948 |
| 2,505,352 | Dillon | Apr. 25, 1950 |
| 2,547,329 | Lapham | Apr. 3, 1951 |

FOREIGN PATENTS

| Number | Country | Date |
| --- | --- | --- |
| 541,398 | France | May 2, 1922 |
| 614,572 | Germany | June 13, 1935 |